United States Patent
Oohata et al.

(10) Patent No.: US 8,829,139 B2
(45) Date of Patent: Sep. 9, 2014

(54) PROCESS FOR PRODUCTION OF POLYSILANE COMPOUND

(75) Inventors: Kimihiko Oohata, Chiba (JP); Satoru Yamazaki, Niigata (JP); Masamichi Yasuhara, Niigata (JP); Jyunichi Kawachi, Niigata (JP)

(73) Assignee: Nippon Soda Co., Ltd., Tokyo (JP)

( * ) Notice: Subject to any disclaimer, the term of this patent is extended or adjusted under 35 U.S.C. 154(b) by 556 days.

(21) Appl. No.: 12/992,775

(22) PCT Filed: May 15, 2009

(86) PCT No.: PCT/JP2009/059082
§ 371 (c)(1),
(2), (4) Date: Nov. 15, 2010

(87) PCT Pub. No.: WO2009/142161
PCT Pub. Date: Nov. 26, 2009

(65) Prior Publication Data
US 2011/0071269 A1    Mar. 24, 2011

(30) Foreign Application Priority Data

May 20, 2008 (JP) .................................. 2008-131899
May 27, 2008 (JP) .................................. 2008-137429

(51) Int. Cl.
C08G 77/08 (2006.01)
C08G 77/60 (2006.01)
C08G 77/34 (2006.01)

(52) U.S. Cl.
CPC .............. C08G 77/60 (2013.01); C08G 77/34 (2013.01); C08G 77/08 (2013.01)
USPC ........................................... 528/14; 528/499

(58) Field of Classification Search
USPC .................................................. 528/14, 499
See application file for complete search history.

(56) References Cited

U.S. PATENT DOCUMENTS

| | | | | |
|---|---|---|---|---|
| 2,563,005 | A | * | 8/1951 | Clark .............................. 528/43 |
| 4,808,685 | A | | 2/1989 | Bortolin |
| 4,960,523 | A | * | 10/1990 | Degen et al. .................. 210/721 |
| 5,159,043 | A | | 10/1992 | Mori et al. |
| 5,905,139 | A | | 5/1999 | Mori et al. |
| 6,114,500 | A | | 9/2000 | Mori et al. |
| 2005/0222359 | A1 | | 10/2005 | Machida et al. |

FOREIGN PATENT DOCUMENTS

| | | |
|---|---|---|
| JP | A 54-65799 | 5/1979 |
| JP | B2 60-46131 | 10/1985 |
| JP | A 63-161025 | 7/1988 |
| JP | A 5-65345 | 3/1993 |
| JP | A 6-329807 | 11/1994 |
| JP | A 9-309954 | 12/1997 |
| JP | A 10-231365 | 9/1998 |
| JP | A 10-237177 | 9/1998 |
| JP | A 11-12362 | 1/1999 |
| JP | A 11-199675 | 7/1999 |
| JP | A 2001-122972 | 5/2001 |
| JP | A 2003-26808 | 1/2003 |
| JP | A 2005-281518 | 10/2005 |
| JP | A 2007-77197 | 3/2007 |
| RU | 2 285 702 C1 | 10/2006 |

OTHER PUBLICATIONS

Sep. 27, 2011 Extended European Search Report issued in European Patent Application No. 09750523.4.
Feb. 20, 2012 Office Action issued in Korean Patent Application No. 10-2010-7025379 (with translation).
Kipping; "Organic Derivatives of Silicon. Part XXX. Complex Silicohydrocarbons [SiPh$_2$]n;" J. Chem. Soc.; vol. 125; pp. 2291-2297; 1924.
Burkhard; "Polydimethylsilanes;" J. Am. Chem. Soc.; vol. 71; pp. 963-964; Mar. 1949.
International Search Report issued in International Patent Application No. PCT/JP2009/059082; mailed Aug. 18, 2009.

* cited by examiner

Primary Examiner — Kuo-Liang Peng
(74) Attorney, Agent, or Firm — Oliff PLC

(57) ABSTRACT

A method for easily producing high-purity polydimethylsilane or polydiphenylsilane, where by-products such as alkali metal salt and alkaline earth metal salt can be efficiently removed, is provided. Dimethyldichlorosilane or diphenyldichlorosilane is reacted with an alkali metal such as metal sodium and metal magnesium and/or an alkaline earth metal in an organic solvent such as toluene to obtain crude polydimethylsilane or crude polydiphenylsilane, methanol having dissolved therein an ether ester-type nonionic surfactant or a surfactant such as alkylbenzenesulfonate is added to the crude polydimethylsilane or the crude polydiphenylsilane to deactivate the remaining alkali metal and alkaline earth metal, and the crude polydimethylsilane or the crude polydiphenylsilane is washed with water in the presence of a surfactant to efficiently remove an alkali metal salt, an alkaline earth metal salt and the like, whereby high-purity polydimethylsilane or polydiphenylsilane is obtained.

7 Claims, No Drawings

PROCESS FOR PRODUCTION OF POLYSILANE COMPOUND

TECHNICAL FIELD

The present invention relates to a production method of polydimethylsilane or polydiphenylsilane. More specifically, the present invention relates to a method for easily producing high-purity polydimethylsilane or polydiphenylsilane, where by-products such as alkali metal salt and alkaline earth metal salt can be efficiently removed.

BACKGROUND ART

A polysilane compound has been studied on its various applications as a precursor of silicon carbide materials or as an optical/electron functional material and, for example, utilization for organic photoreceptors, optical waveguides and optical memories has been proposed. As the method to synthesize a polysilane compound, a Wurtz coupling method of contacting and reacting an organochlorosilane compound with an alkali metal in an organic solvent is known (Non-Patent Documents 1 and 2). Also, in Patent Documents 1 and 2, a method of melting and dispersing a metal sodium in xylene, adding dropwise dimethyldichlorosilane thereto, and heating the mixture under reflux for 10 hours is disclosed.

An alkali metal is added so as to allow such a Wurtz coupling reaction to proceed. Therefore, an alkali metal salt produced by the contact reaction, a deactivated alkali metal and an unreacted monomer remain in a crude polysilane compound that is a reaction product. As for the method to remove an alkali metal salt produced by the contact reaction, a deactivated alkali metal and an unreacted monomer from the reaction product, a method of adding water to the reaction vessel, solubilizing those components in water, separating the polysilane compound-containing organic solvent phase by liquid separation, and purifying it is known. Also, Patent Documents 1 and 2 disclose a method of filtering a black-violet precipitate produced by reaction, decomposing an unreacted metal sodium with methanol, and water-washing and drying the residue to obtain a white polysilane compound.

BACKGROUND ART

Patent Document

Patent Document 1: Japanese Patent No. 1362553
Patent Document 2: JP-A-54-65799

Non-Patent Document

Non-Patent Document J. Chem. Soc., Vol. 125, page 2291 (1924)
Non-Patent Document 2: J. Am. Chem. Soc., Vol. 71, page 963 (1949)

SUMMARY OF THE INVENTION

Problems that the Invention is to Solve

Polydimethylsilane or polydiphenylsilane obtained by the contract reaction between dimethyldichlorosilane or diphenyldichlorosilane and an alkali metal in an organic solvent is usually a crystal insoluble in an organic solvent and has a property of decomposing without melting even when heated. Furthermore, polydimethylsilane or polydiphenylsilane has high water repellency and despite the attempt to wash the by-product alkali metal salts with water, polydimethylsilane or polydiphenylsilane floats on water to allow for very inefficient contact with water. Therefore, by-products such as alkali metal salt cannot be sufficiently removed unless a large amount of water is used at the water washing or the number of water washings is increased.

When a polysilane compound still retaining an alkali metal ion is used as the precursor of a silicon carbide material, the pyrolysis tank used in a heat treatment may be corroded or in the application as an optical waveguide/electronic material, propagation loss and the like may be brought about. Furthermore, remaining of an unreacted alkali metal bears the risk of ignition due to water or moisture at the filtering.

An object of the present invention is provide a method for easily producing high-purity polydimethylsilane or polydiphenylsilane, where by-products such as alkali metal salt and alkaline earth metal salt can be efficiently removed.

Means for Solving the Problems

As a result of intensive studies to attain the above-described object, the present inventors have found that when dimethyldichlorosilane or diphenyldichlorosilane (hereinafter, these compounds are collectively referred to as a "raw material dichlorosilane compound") is reacted with an alkali metal and/or an alkaline earth metal in an organic solvent to produce crude polydimethylsilane or crude polydiphenylsilane and when the alkali metal and alkaline earth metal in the crude polydimethylsilane or the crude polydiphenylsilane are deactivated and the crude polydimethylsilane or crude polydiphenylsilane is then washed with water in the presence of a surfactant, high-purity polydimethylsilane or polydiphenylsilane reduced in the residual amount of by-products such as alkali metal salt and alkaline earth metal salt can be easily produced with a small number of water washings. After further studies based on this finding, the present invention have been accomplished.

Advantage of the Invention

By the production method of the present invention, high-purity polydimethylsilane or polydiphenylsilane low in the residual amount of by-products such as alkali metal salt and alkaline earth metal salt can be easily obtained. The obtained polydimethylsilane or polydiphenylsilane is suitable as a precursor of silicon carbide materials or as an optical/electron functional material for organic photoreceptors, optical waveguides, optical memories and the like.

MODE FOR CARRYING OUT THE INVENTION

The method for producing polydimethylsilane or polydiphenylsilane of the present invention includes steps of reacting a raw material dichlorosilane compound with an alkali metal and/or an alkaline earth metal in an organic solvent to obtain crude polydimethylsilane or crude polydiphenylsilane, deactivating the alkali metal and the alkaline earth metal in the crude polydimethylsilane or the crude polydiphenylsilane, and water-washing the crude polydimethylsilane or the crude polydiphenylsilane in the presence of a surfactant.

Examples of the alkali metal for use in the present invention include elementary lithium, elementary sodium, elementary potassium, and an alloy thereof. Among these, elementary sodium is preferred. Examples of the alkaline earth metal for use in the present invention include elementary magnesium, elementary calcium, elementary barium, elementary strontium, and an alloy thereof. Among these, elementary magnesium is preferred.

The alkali metal and alkaline earth metal are used in an amount slightly in excess of the theoretical amount based on the raw material dichlorosilane compound. Specifically, the amount of the alkali metal used is preferably from 2.0 to 2.4 molar equivalents, more preferably from 2.1 to 2.2 molar equivalent, and the amount of the alkaline earth metal used is preferably from 1.0 to 1.2 molar equivalents, more preferably from 1.05 to 1.1 molar equivalent. If the amount used is less than 2.0 molar equivalents in the case of the alkali metal or is less than 1.0 molar equivalents in the case of the alkaline earth metal, the reaction rate is reduced and the time necessary for the reaction is liable to become long. Also, if the amount used exceeds 2.4 molar equivalents in the case of the alkali metal or exceeds 1.2 molar equivalents in the case of the alkaline earth metal, the alkali metal and/or alkaline earth metal remaining in the reaction product are increased and a long time tends to be required for the removing step.

Specific examples of the organic solvent used for the reaction include an ether-based solvent such as tetrahydrofuran, 2-methyltetrahydrofuran, 1,4-dioxane, anisole, 1,2-dimethoxyethane, diethylene glycol dibutyl ether, diethylene glycol diethyl ether, diethyl ether, diisopropyl ether and tert-butyl methyl ether; an aliphatic hydro carbon-based solvent such as hexane, heptane, octane and decane; and an aromatic hydrocarbon-based solvent such as benzene, toluene, xylene and mesitylene. One of these may be used alone, or two or more thereof may be used as a mixture. Among these, an aromatic hydrocarbon-based solvent is preferred.

The temperature when performing the reaction of the dichlorosilane compound with the alkali metal and/or the alkaline earth metal is not particularly limited but is preferably from 98° C. to solvent refluxing temperature. The reaction is preferably performed in an inert gas atmosphere such as nitrogen and may be performed under atmospheric pressure or under pressure.

The reaction method is not particularly limited but specifically, it is preferred to disperse the alkali metal and/or the alkaline earth metal in the organic solvent described above and add dropwise the raw material dichlorosilane compound thereto with stirring to perform the reaction.

In order to complete the reaction, after the dropwise addition of the raw material dichlorosilane, stirring is preferably continued at the above-described reaction temperature for 1 to 24 hours, more preferably for 1 to 12 hours.

The raw material dichlorosilane compound is polycondensed by the reaction above, and a solution where crude polydimethylsilane or crude polydiphenylsilane is dispersed in the organic solvent is obtained. This liquid dispersion is cooled usually to 40 to 80° C. After cooling, the alkali metal and the alkaline earth metal in the crude polydimethylsilane or the crude polydiphenylsilane are deactivated. Usually, an alcohol is used for deactivating the alkali metal and the alkaline earth metal. For example, the alkali metal and the alkaline earth metal can be deactivated by adding an alcohol to a liquid dispersion of the crude polydimethylsilane or the crude polydiphenylsilane or by adding a liquid dispersion of the crude polydimethylsilane or the crude polydiphenylsilane to an alcohol. Examples of the alcohol used include methanol, ethanol, isopropyl alcohol, n-propyl alcohol, 2-methylpropyl alcohol, n-butyl alcohol, tert-butyl alcohol and ethylene glycol. Among these, methanol is preferred. The amount of the alcohol used is not particularly limited as long as the alcohol is an alcohol having an equivalent or greater molar number in the case of the alkali metal or a double or greater molar number in the case of the alkaline earth metal, based on the molar number of the remaining alkali metal or alkaline earth metal. Specifically, when metal sodium is used in an amount of 2.1 molar equivalents based on the dimethyldichlorosilane or the diphenyldichlorosilane, the alcohol is preferably used in an amount of 0.1 to 0.5 molar equivalents, more preferably from 0.2 to 0.3 molar equivalents.

Subsequently, hydrolysis can be performed by adding water to the solution after deactivation. The amount of water used is not particularly limited as long as it is an amount large enough to effect the hydrolysis and disperse the polymer.

In the step of deactivating the alkali metal and the alkaline earth metal and performing the hydrolysis, it is preferred to dissolve a surfactant in the alcohol used for the deactivation of the alkali metal and the alkaline earth metal and/or to dissolve a surfactant in the water used for the hydrolysis. Thanks to the surfactant, dispersibility of the crude polydimethylsilane or the crude polydiphenylsilane is enhanced to allow for efficient contact with water in the later-described water washing.

Examples of the surfactant for use in the present invention include an anionic surfactant, a cationic surfactant, an amphoteric surfactant and a nonionic surfactant.

Examples of the anionic surfactant include a fatty acid salt, an alkylbenzenesulfonate, a higher alcohol sulfate salt, a polyoxyethylene alkyl ether sulfate, an α-sulfofatty acid ester, an α-olefin sulfonate, a monoalkyl phosphate salt and an alkanesulfonate.

Examples of the cationic surfactant include an alkyltrimethyl ammonium salt, a dialkyldimethyl ammonium salt and an alkyldimethylbenzyl ammonium salt.

Examples of the amphoteric surfactant include an alkylamine oxide, an alkylbetaine, an alkylcarboxybetaine and an alkylamino fatty acid salt.

Examples of the nonionic surfactant include a polyoxyalkylene alkyl ether, a polyoxyalkylene alkylphenyl ether, an alkyl glucoside, a polyoxyethylene fatty acid ester, a sucrose fatty acid ester, a sorbitan fatty acid ester, a polyoxyethylene sorbitan fatty acid ester, and a fatty acid alkanolamide.

Among these, an anionic surfactant and a nonionic surfactant are preferred, and a nonionic surfactant is more preferred. The alkyl chain contained in the nonionic surfactant is preferably a carbon chain in the range of $C_8$ to $C_{20}$ and may be branched. Out of the nonionic surfactant, preferred are a polyoxyethylene propylene alkyl ether and a polyoxyethylene propylene alkylphenyl ether which are a polyoxyalkylene alkyl ether.

The surfactant for use in the present invention is not particularly limited in its HLB, but a surfactant having a high HLB is preferred. Specifically, HLB is preferably from 5 to 20, more preferably from 10 to 15, still more preferably from 12 to 15. Also, the surfactant for use in the present invention is not particularly limited in its clouding point but, specifically, a surfactant having a clouding point of 0 to 100° C. is preferred, and a surfactant having a clouding point of 20 to 95° C. is more preferred. Furthermore, the clouding point is preferably present in the vicinity of water temperature at the water washing. In other words, the clouding point is preferably in the temperature range between a temperature 10° C. lower than the temperature at the water washing and a temperature 10° C. higher than that, more preferably in the range between a temperature 5° C. lower and a temperature 5° C. higher.

The amount of the surfactant added is preferably from 0.1 to 20 parts by mass, more preferably from 0.6 to 8 parts by mass, per 129 parts by mass of dimethyldichlorosilane used as the raw material, and is preferably from 0.2 to 40 parts by mass, more preferably from 1 to 20 parts by mass, per 253 parts by mass of diphenyldichlorosilane used as the raw material. If the amount of the surfactant is too small, the crystal is liable to float up and the washing effect tends to be reduced. The surfactant may be added in a large amount, but this is not profitable because the effect is saturated.

The reaction product is solidified by the hydrolysis and forms a slurry. The slurry containing the surfactant is washed with water. The water may be added after removing the organic solvent, may be added while removing the organic solvent, or may be added before removing the organic solvent. For the reason that the viscosity of the reaction product is reduced and the stirring power can be low, water is preferably added while removing the organic solvent or before removing the organic solvent. Incidentally, the method for removing the organic solvent is not particularly limited, and examples thereof include distillation and evaporation.

In the water washing, it is preferred to heat water after adding it at normal temperature or add hot water. The water temperature at the washing is preferably 25° C. or more, more preferably from 40 to 80° C. Incidentally, the water used for water washing can be removed by a known solid-liquid separation operation such as decantation and filtration. The number of water washings is not particularly limited and can be appropriately selected according to the removing state of by-products such as alkali metal and alkaline earth metal.

The polydimethylsilane or polydiphenylsilane after the completion of water washing is separated from the solution by filtration or the like and dried. Before drying the polydimethylsilane or polydiphenylsilane separated, the surfactant added may be eluted and removed by using an organic solvent such as alcohol and aromatic hydrocarbon.

The polydimethylsilane or polydiphenylsilane obtained by the production method of the present invention is usually insoluble in an organic solvent and an acid/alkali. The molecular weight of the polydimethylsilane or polydiphenylsilane obtained by the production method of the present invention is not particularly limited. Polydimethylsilane or polydiphenylsilane having an appropriate molecular weight according to the usage can be produced by the production method of the present invention. For example, "Yuki Kelso Polymer no Kaihatsu (development of Organic Silicon Polymer)" (Hideki Sakurai (supervisor); page 106; CMC Shuppan) discloses polydimethylsilane having a number average molecular weight of 2,580 and a weight average molecular weight of 4,650, and polydimethylsilane having a such a molecular weight can be produced also by the production method of the present invention. Incidentally, the molecular weight of polydimethylsilane or polydiphenylsilane can be determined by ultrahigh-temperature GPC.

EXAMPLES

The present invention is described in greater detail below by referring to Examples. However, the present invention is not limited to these Examples.

Example 1

The inside of a four-neck flask equipped with a motor-driven stirrer, a thermometer, a dropping funnel and a reflux condenser was replaced with nitrogen. The flask was charged with 24 parts by mass (1.05 parts by mol) of metal sodium and 62 parts by mass of toluene (specific gravity: 0.867) and heated at 110° C. or more to melt the metal sodium, and the molten metal sodium was dispersed by vigorously stirring the system. While keeping the refluxing state, 64.5 parts by mass (0.5 parts by mol) of dimethyldichlorosilane was added dropwise to the flask over 8 hours. The contents were gradually discolored into a black-violet color. After the completion of dropwise addition, the refluxing state was held for 8 hours with stirring. A black-violet slurry was obtained.

The slurry was cooled to 40° C., and 3.2 parts by mass (0.1 parts by mol) of methanol having dissolved therein 0.4 parts by mass of a nonionic surfactant (polyoxyalkylene alkyl ether, HLB=14.1, clouding point: 65° C. (Newcalgen D-1110DIR, produced by Takemoto Oils & Fats Co., Ltd.)) was slowly added dropwise thereto. The remaining alkali metal in the slurry was converted to methylate and thereby deactivated. Water was added thereto, whereupon a hydrolysis reaction occurred and the flowability was gradually reduced, and a violet lump was obtained. This reaction mixture was heated under stirring slowly to distill off toluene/water, as a result, the solidified lump was gradually disintegrated while changing to white and slurried.

The resulting slurry was filtered under reduced pressure to discharge an aqueous phase containing an alkali metal salt and the like which are a reaction by-product. 100 Parts by mass of hot water at 40° C. was added to the separated solid content, and the mixture was stirred for 30 minutes and filtered under reduced pressure to obtain a solid content. This water washing operation was performed 5 times in total. Subsequently, in manner of the water washing operation above, washing with 47.58 parts by mass of methanol (specific gravity: 0.793) was performed 3 times and washing with 52.0 parts by mass of toluene (specific gravity: 0.867) was performed three times. The obtained solid content was taken out of the filtration apparatus and dried to obtain 25 parts by mass of white polydimethylsilane (yield: 86%). The content of sodium chloride remaining in the polydimethylsilane was 100 ppm or less.

Example 2

Polydimethylsilane was obtained by the same method as in Example 1 except that 3.2 parts by mass (0.1 parts by mol) of methanol was added dropwise over 30 minutes instead of adding dropwise a methanol solution of a nonionic surfactant (polyoxyalkylene alkyl ether, HLB-14.1, clouding point: 65° C. (Newcalgen D-1110DIR, produced by Takemoto Oils & Fats Co., Ltd.)), 13 parts by mass of a 5% aqueous solution of a nonionic surfactant (polyoxyalkylene alkyl ether, HLB=14.1, clouding point: 65° C. (Newcalgen D-1110DIR, produced by Takemoto Oils & Fats Co., Ltd.)) was then added dropwise over 30 minutes, and the water washing operation was performed 20 times in total. The yield was 85%.

In Example 2, the reaction mixture was gradually solidified while adding dropwise the 5% aqueous solution of nonionic surfactant. Also, although a small amount of the crystal floated up at the water washing, the sodium chloride content in the polydimethylsilane was about 100 ppm.

Comparative Example 1

Polydimethylsilane was obtained by the same method as in Example 2 except for not performing the dropwise addition of a 5% aqueous solution of a nonionic surfactant (polyoxyalkylene alkyl ether, HLB=14.1, clouding point: 65° C. (Newcalgen D-1110DIR, produced by Takemoto Oils & Fats Co., Ltd.)). The yield was 88%. The sodium chloride content in the polydimethylsilane was 800 ppm or more.

Example 3

Polydimethylsilane was obtained by the same method as in Example 2 except for changing the 5% aqueous solution of a nonionic surfactant (polyoxyalkylene alkyl ether, HLB=14.1, clouding point: 65° C. (Newcalgen D-1110DIR, produced by Takemoto Oils & Fats Co., Ltd.)) used in Example 2 to a 5% aqueous solution of a nonionic surfactant (polyethylene glycol ester, HLB-5.5 (ADEKANOL NK-3, produced by ADEKA Corp.)). The yield was 84%. The crystal floated up at the 8th or later water washing, but the sodium chloride content in the polydimethylsilane was about 100 ppm.

Example 4

Polydimethylsilane was obtained by the same method as in Example 2 except for changing the 5% aqueous solution of a nonionic surfactant (polyoxyalkylene alkyl ether, HLB-14.1, clouding point: 65° C. (Newcalgen D-1110DIR, produced by Takemoto Oils & Fats Co., Ltd.)) used in Example 2 to a 5% aqueous solution of a nonionic surfactant (polyoxyethylene glycol ester, HLB-9.0 (ADEKANOL NK-4, produced by ADEKA Corp.)). The yield was 80%. The crystal floated up at the 8th or later water washing, but the sodium chloride content in the polydimethylsilane was about 100 ppm.

Example 5

Polydimethylsilane was obtained by the same method as in Example 2 except for changing the 5% aqueous solution of a nonionic surfactant (polyoxyalkylene alkyl ether, HL13-14.1, clouding point: 65° C. (Newcalgen D-1110DIR, produced by Takemoto Oils & Fats Co., Ltd.)) used in Example 2 to a 5% aqueous solution of a nonionic surfactant (polyoxyethylene octylphenyl ether, HLB-13.5, clouding point: 65° C. (Triton X-100, produced by UCC and Plastic)). Dispersibility at the water washing was very good and the crystal did not float on water. The sodium chloride content in the polydimethylsilane was 100 ppm or less. The yield was 80%.

Example 6

Polydimethylsilane was obtained by the same method as in Example 2 except for changing the 5% aqueous solution of a nonionic surfactant (polyoxyalkylene alkyl ether, HLB-14.1, clouding point: 65° C. (Newcalgen D-1110DIR, produced by Takemoto Oils & Fats Co., Ltd.)) used in Example 2 to a 5% aqueous solution of an anionic surfactant (sodium n-dodecylbenzenesulfonate (TAYCAPOWER LN2050D, produced by Tayca Corp.)). The yield was 80%. Dispersibility at the water washing was low and when the stirring was stopped, the solid content was separated in the upper part. The crystal floated up at the 8th or later water washing, but the sodium chloride content in the polydimethylsilane was about 100 ppm.

While the invention has been described in detail and with reference to specific embodiments thereof, it will be apparent to one skilled in the art that various changes and modifications can be made therein without departing from the spirit and scope of the invention.

This application is based on Japanese Patent Application (Patent Application No. 2008-131899) filed on May 20, 2008 and Japanese Patent Application (Patent Application No. 2008-137429) filed on May 27, 2008, the contents of which are incorporated herein by way of reference.

INDUSTRIAL APPLICABILITY

The polydimethylsilane or polydiphenylsilane obtained by the production method of the present invention is suitable as a precursor of silicon carbide materials or as an optical/electron functional material for organic photoreceptors, optical waveguides, optical memories and the like. Also, the polydimethylsilane or polydiphenylsilane obtained by the production method of the present invention can be utilized for ceramic raw materials, electrically conductive materials and light-related materials (resist materials).

For example, the polydimethylsilane or polydiphenylsilane obtained by the production method of the present invention is melt-spun, cured and heat-treated (fired), or after blending the polydimethylsilane or polydiphenylsilane obtained by the production method of the present invention with a pyrolytically evanescent resin, the blend is melt-spun, cured and heat-treated (fired), whereby a thin silicon carbide fiber free from a change in the tensile strength or modulus over a region from low temperature to high temperature, excellent in the oxidation resistance and assured of very low reactivity with a metal can be obtained. This silicon carbide fiber can be compounded, for example, with a resin, a ceramic or a metal and utilized as a composite material excellent in the heat resistance or mechanical strength for the catalyst support used in an exhaust gas filter or the like of diesel engines.

The invention claimed is:

1. A method for producing polydimethylsilane or polydiphenylsilane, comprising steps of reacting dimethyldichlorosilane or diphenyldichlorosilane with an alkali metal and/or an alkaline earth metal in an organic solvent to obtain crude polydimethylsilane or crude polydiphenylsilane, deactivating the alkali metal and the alkaline earth metal in said crude polydimethylsilane or said crude polydiphenylsilane, and water-washing the crude polydimethylsilane or the crude polydiphenylsilane in the presence of a surfactant,
   wherein the crude polydimethylsilane and crude polydiphenylsilane are insoluble in the organic solvent and have high water repellency.

2. The method for producing polydimethylsilane or polydiphenylsilane according to claim 1, wherein the deactivation of the alkali metal and the alkaline earth metal is performed using an alcohol having dissolved therein a surfactant.

3. The method for producing polydimethylsilane or polydiphenylsilane according to claim 1, wherein the surfactant is an anionic surfactant or a nonionic surfactant.

4. The method for producing polydimethylsilane or polydiphenylsilane according to claim 3, wherein the surfactant is a nonionic surfactant.

5. The method for producing polydimethylsilane or polydiphenylsilane according to claim 2, wherein the surfactant is an anionic surfactant or a nonionic surfactant.

6. The method for producing polydimethylsilane or polydiphenylsilane according to claim 5, wherein the surfactant is a nonionic surfactant.

7. The method for producing polydimethylsilane or polydiphenylsilane according to claim 1, wherein the surfactant has an HLB of 5 to 20.

* * * * *